United States Patent [19]
Chiang

[11] Patent Number: 5,855,164
[45] Date of Patent: Jan. 5, 1999

[54] ROASTING APPARATUS EASILY CONVERTIBLE INTO A BREAD MAKING APPARATUS

[76] Inventor: Hanh Chiang, No. 162, Chung-Chen S. Rd., Hsia-Jen Hsiang, Tainan Hsien, Taiwan

[21] Appl. No.: 83,006

[22] Filed: May 21, 1998

[51] Int. Cl.$^6$ ............................. A21B 1/00; A21D 8/00; A47J 27/00; A47J 37/00
[52] U.S. Cl. ............................ 99/340; 99/348; 99/427; 99/446; 366/146; 366/314; 366/601
[58] Field of Search ........................... 99/325–333, 339, 99/400, 340, 401, 348, 426, 357, 427, 467, 468, 448, 450, 483, 444–446; 366/69, 98, 144–146, 314, 601; 126/21 A, 41 R; 426/504, 512, 523; 219/400, 401, 492, 494, 497

[56] References Cited

U.S. PATENT DOCUMENTS

| | | | |
|---|---|---|---|
| 4,294,166 | 10/1981 | Takeuchi | 99/348 |
| 4,870,896 | 10/1989 | Asahina et al. | 99/348 |
| 5,410,949 | 5/1995 | Yung | 366/146 X |
| 5,415,081 | 5/1995 | Yoshida et al. | 99/326 |
| 5,477,776 | 12/1995 | Shimokubo et al. | 366/314 X |
| 5,513,557 | 5/1996 | Chiang | 99/327 |
| 5,562,020 | 10/1996 | Shigeshiro | 219/492 X |
| 5,584,230 | 12/1996 | Yoshida et al. | 99/326 |
| 5,584,233 | 12/1996 | Glucksman et al. | 99/474 |
| 5,588,353 | 12/1996 | Glucksman et al. | 99/468 X |
| 5,694,832 | 12/1997 | Kakimoto et al. | 99/348 |
| 5,722,314 | 3/1998 | Nakano et al. | 99/331 |
| 5,735,190 | 4/1998 | Sham | 99/348 |

Primary Examiner—Timothy F. Simone
Attorney, Agent, or Firm—Townsend and Townsend and Crew LLP

[57] ABSTRACT

A roasting apparatus includes an outer annular wall, an inner annular wall disposed in the outer annular wall to define a roasting chamber, a radiant heating element disposed on an inner surface of the inner annular wall, an oil accumulating plate disposed in the roasting chamber and having a hub portion underneath thereof and coaxial with a rotating shaft in the roasting chamber, a roasting rack member above the oil accumulating plate, a speed reduction mechanism to couple the rotating shaft and the hub portion such that the latter rotates at a speed slower than that of the rotating shaft to drive the oil accumulating plate and the roasting rack member.

5 Claims, 9 Drawing Sheets

ROASTING APPARATUS EASILY CONVERTIBLE INTO A BREAD MAKING APPARATUS

FIELD OF THE INVENTION

1. Background of the Invention

The invention relates to a roasting apparatus for roasting food therein, more particularly to a roasting apparatus which can be easily converted into a bread making apparatus after removal of a roasting rack member and an oil accumulating plate from the roasting apparatus.

2. Description of the Related Art

Urban dwellers have a limited kitchen space. However, there are plenty of electrical home appliances to be used in the kitchen, such as a roasting apparatus and a bread making apparatus, each of which is bulky in dimension. It is thus preferred to combine the functions of two apparatus into one to minimize the space occupied by the apparatuses.

SUMMARY OF THE INVENTION

Therefore, the object of this invention is to provide a roasting apparatus which can be easily converted into a bread making apparatus that makes dough by kneading raw ingredients introduced into a bread baking case installed in an oven.

Accordingly, a roasting apparatus of this invention is easily convertible into a bread baking apparatus which makes dough by kneading raw ingredients introduced into a bread baking case installed in an oven. The roasting apparatus includes an outer bottom wall, an outer annular wall that extends upwardly from the periphery confining the outer bottom wall to form an outer upper portion and an outer lower portion, an inner bottom wall disposed inwardly and upwardly spaced apart from the outer bottom wall to define a lower accommodation chamber between the outer and inner bottom walls, an inner annular wall extending upwardly from the periphery that confines the inner bottom wall to form an inner upper portion and an inner lower portion which are disposed inwardly and laterally spaced apart from the outer annular wall to define a roasting chamber within the inner annular wall. A radiant heating element is disposed on an inner surface of the inner lower portion. A ventilation duct is interposed between the inner and outer lower portions, and has an air inlet disposed at a level below the radiant heating element, and in air stream communication with the roasting chamber at a position lower than the radiant heating element. An air ventilation member is disposed to suck air into the ventilation duct via the air inlet so as to distribute heat from the radiant heating element to the roasting chamber via convection. A drive member is disposed in the lower accommodation chamber, and includes a drive shaft mounted rotatably on and extending upwardly and outwardly of the inner bottom wall to define a first rotation axis extending from the inner lower portion toward the inner upper portion in an upward direction. A first coupling member includes a first central portion mounted fixedly on the drive shaft, a first peripheral portion around the first central portion, and a first coupling unit disposed on the first peripheral portion. A second coupling member includes a second central portion, a rotating axle disposed on the second central portion and coaxial to and spaced apart from the drive shaft, a second peripheral portion disposed around the second central portion, and a second coupling unit disposed on the second peripheral portion such that through an engagement of the first and second coupling units, the rotating axle is driven to rotate with at a same speed as the drive shaft. An oil accumulating plate has a central portion, a peripheral portion around the central portion, and a hub portion disposed underneath a bottom surface of the central portion to define a second rotation axis coaxial to the first rotation axis. The hub portion is coaxially spaced and is rotatable relative to the rotating axle. A speed reduction mechanism couples the rotating axle and the hub portion such that the speed of the hub portion is slower than that of the rotating axle. A roasting rack member is disposed on and spaced apart from the oil accumulating plate, and is adapted to hold or suspend food that is to be roasted.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
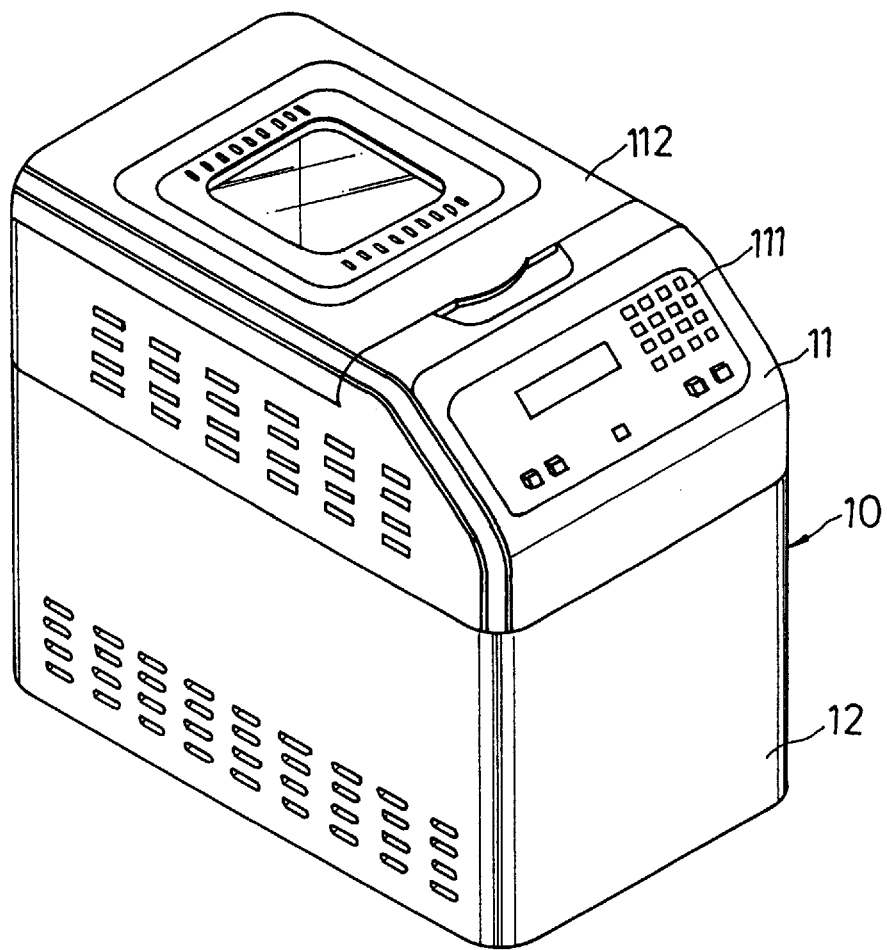
FIG. 1 is a perspective view of a preferred embodiment of a roasting apparatus of this invention which can be easily converted into a bread baking apparatus.

The preferred embodiment of a roasting apparatus of this invention is easily convertible into a bread making apparatus which makes dough by kneading raw ingredients introduced into a bread baking case installed in an oven.

Referring to FIGS. 1, 2, 3 and 4, the preferred embodiment is shown to include a housing unit 10, a radiant heating element 211, a ventilation duct 231, an air ventilation member 23, a drive member 22, a first coupling member 214, a second coupling member 531, an oil accumulating plate 40, a speed reduction mechanism 60, and a roasting rack member 70.

As illustrated, the housing unit 10 includes a lower housing 12, and an upper housing 11 formed with a switch actuating panel 111 and mounted detachably on the lower housing 12. The upper housing 11 is formed with an upper opening and is provided with a removable cover 112 for covering the upper opening.

The lower housing 12 includes an outer bottom wall 10A, an outer annular wall 120 which extends upwardly from the periphery confining the outer bottom wall 10A to form an outer upper portion 120T and an outer lower portion 120B, and an inner bottom wall 10B disposed inwardly and upwardly spaced apart from the outer bottom wall 120 to define a lower accommodation chamber 20 between the outer and inner bottom walls 10A, 10B. The lower housing 12 further includes an inner annular wall 21 which extends upwardly from the periphery confining the inner bottom wall 10B to form an inner upper portion 21T and an inner lower portion 21B which are disposed inwardly and laterally spaced apart from the outer annular wall 120 to define a roasting chamber 10C within the inner annular wall 21. The radiant heating element 211, in the form of a spiral, is disposed on an inner surface of the inner lower portion 21B of the inner annular wall 21.

The ventilation duct 231 is interposed between the inner and outer lower portions 21B, 120B, and has an air inlet 23A (see FIG. 4) disposed in the inner annular wall 21 at a level below the radiant heating element 211, and in air stream communication with the roasting chamber 10C at a position lower than the radiant heating element 211.

The ventilation member 23 is disposed above the inner bottom wall 10B adjacent to the inner annular wall 21 to suck air into the ventilation duct 231 via the air inlet 23A so as to distribute heat from the radiant heating element 211 to the roasting chamber 10C via convection.

Figure 6:
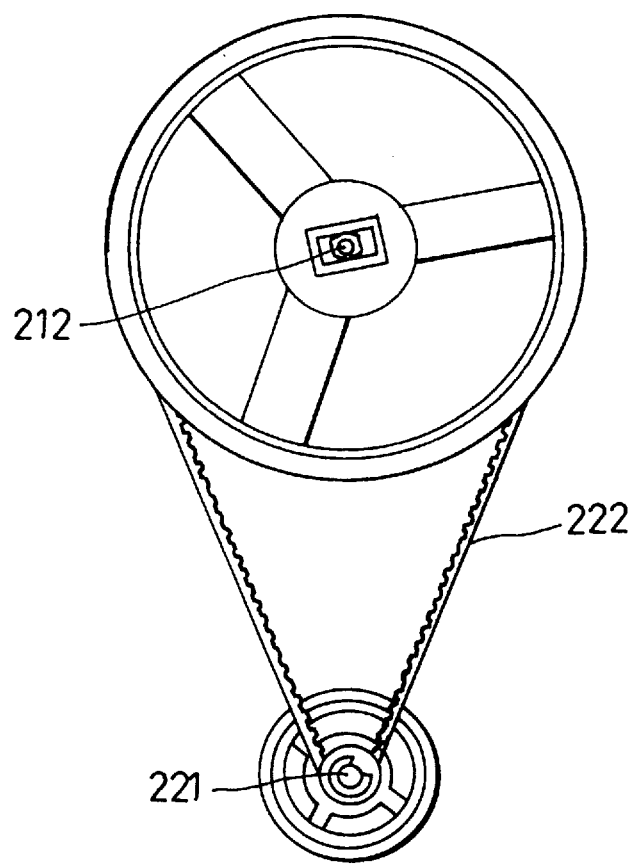
FIG. 6 illustrates how a rotating shaft of the preferred embodiment is driven in order to rotate the oil accumulating plate and the roasting rack member shown in FIG. 3.

The drive member 22 is mounted above the inner bottom wall 10B, and includes a drive shaft 212 mounted rotatably in the lower accommodation chamber 20 such that the drive shaft 212 projects upwardly and outwardly of the inner bottom wall 10B to define a first rotation axis which extends from the inner lower portion 21B toward the inner upper portion 21T. The drive shaft 212 is connected to the driving shaft 221 of a motor 22 fixed on the inner bottom wall 10B via a transmission belt 222, as best shown in FIG. 6.

The first coupling member 214 includes a first central portion 214A mounted fixedly on the drive shaft 212, a first peripheral portion 214B around the first central portion 214A, and a first coupling unit disposed on the first peripheral portion 214B.

The second coupling member 531 includes a second central portion 532 in the form of a bearing, a rotating axle 53 disposed on the second central portion 532 and coaxial to and spaced apart from the drive shaft 212, a second peripheral portion disposed around the second central portion 532, and a second coupling unit disposed on the second peripheral portion such that through an engagement of the first and second coupling units 214, 531, the rotating axle 53 is driven to rotate at a same speed as the drive shaft 212.

The oil accumulating plate 40 has a central portion 44, a peripheral portion around the central portion 44, and a hub portion 621 disposed underneath a bottom surface of the central portion 44 to define a second rotation axis coaxial to the first rotation axis. The hub portion 621 is coaxially spaced and rotatable relative to the rotating axle 53.

The speed reduction mechanism 60 couples the rotating axle 53 and the hub portion 621 such that the speed of the hub portion 621 is slower than that of the rotating axle 53.

The roasting rack member 70 is disposed on and spaced apart from the oil accumulating plate 40, and is adapted to hold or suspend food that is to be roasted.

Figure 2:
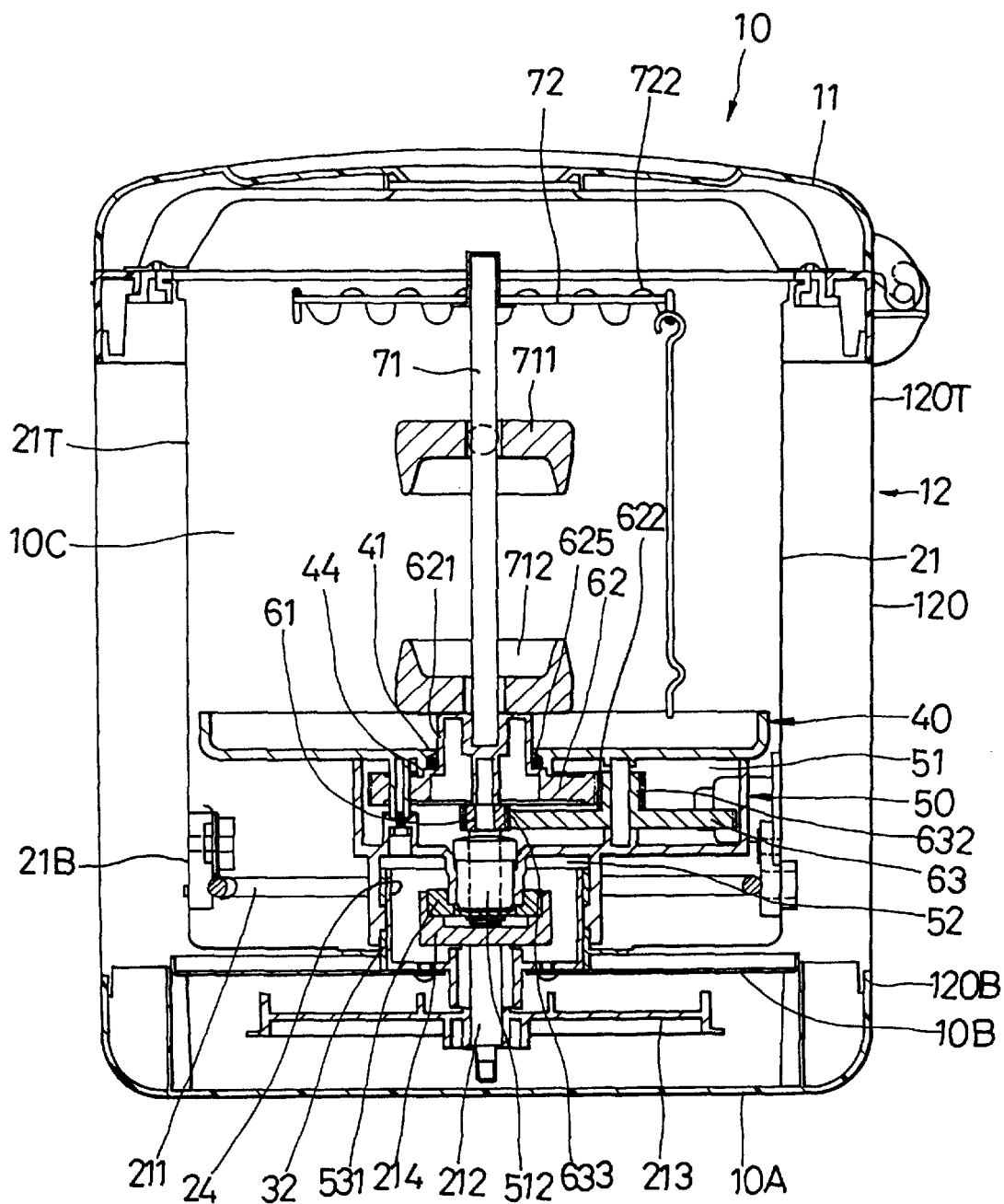
FIG. 2 is a sectional view of the preferred embodiment.
Figure 3:
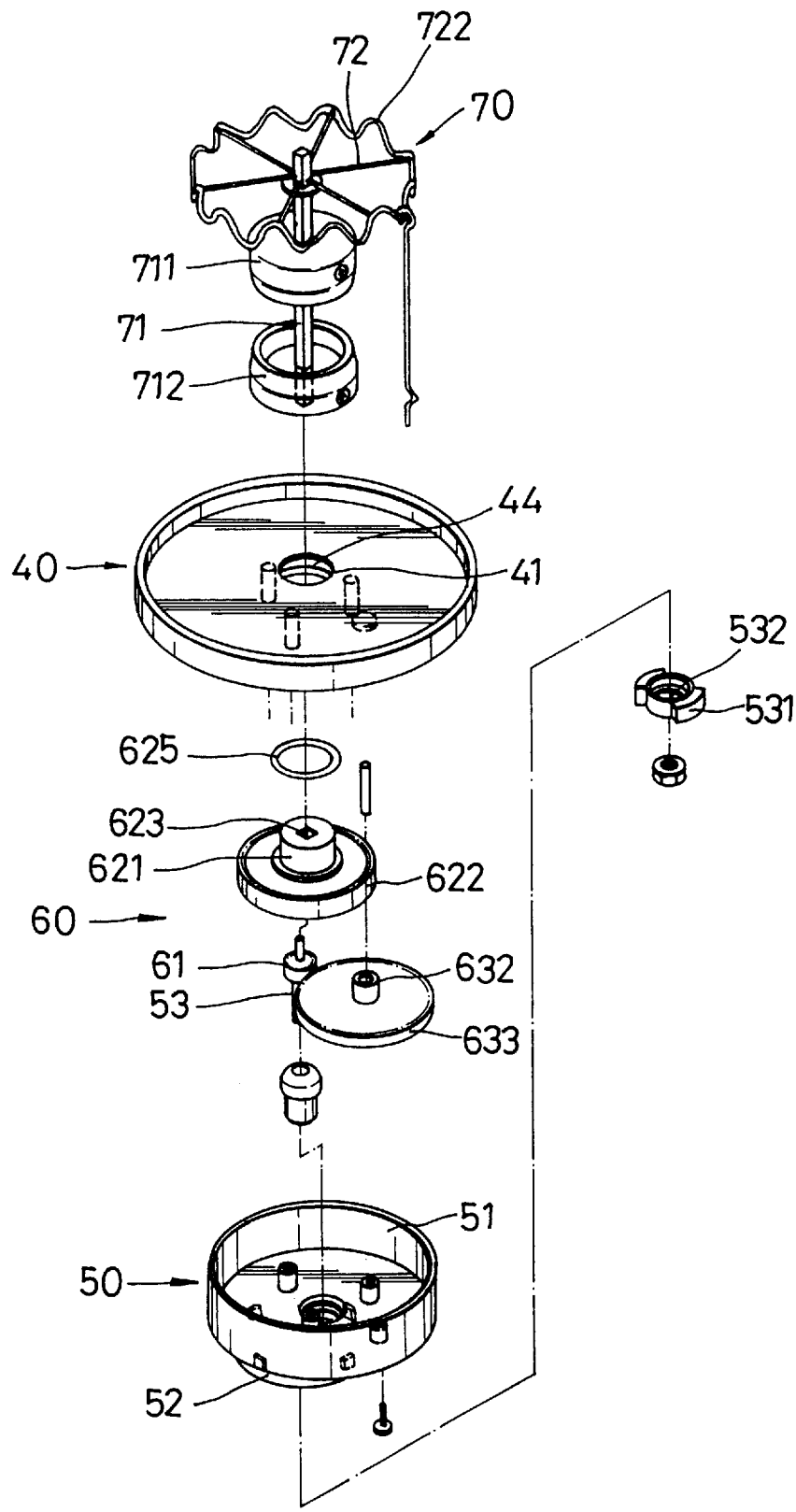
FIG. 3 is an exploded view of an oil accumulating plate, a roasting rack member and a speed reduction mechanism employed in the preferred embodiment.
Figure 5:
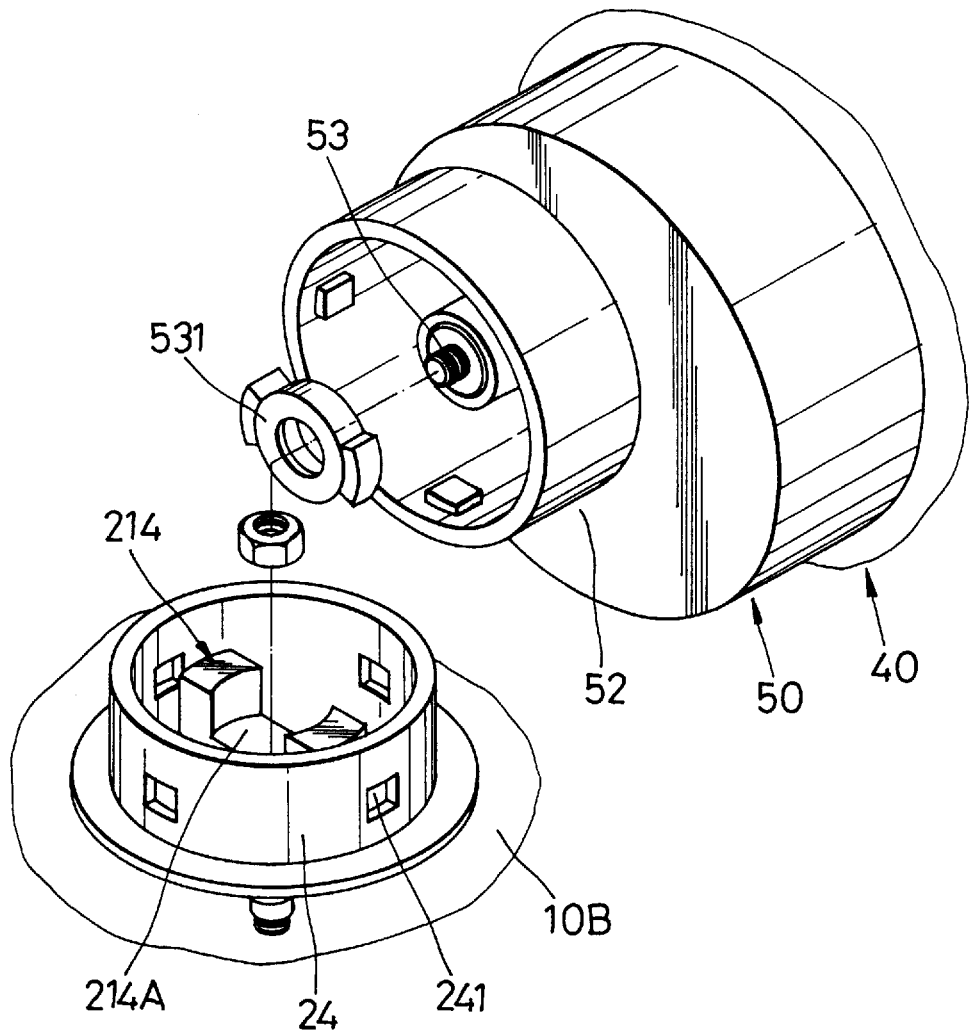
FIG. 5 illustrates how the oil accumulating plate shown in FIG. 3 is mounted into the inner annular wall in the preferred embodiment.

Referring to FIGS. 2, 3 and 5, the preferred embodiment further includes a tubular member 50 disposed underneath the oil accumulating plate 40 to permit extension of the rotating axle 53 therethrough. The tubular member 50 has a lower constricted portion 52 mounted detachably on the inner bottom wall 10B, and an upper enlarged portion which defines an upper accommodating chamber 51 to accommodate the hub portion 621 therein and to support the oil accumulating plate 40 thereabove. The speed reduction mechanism 60 includes a driving gear 61 disposed in the upper accommodating chamber 51 and fixed coaxially on the rotating axle 53, a driven gear 633 disposed offset relative to the rotating shaft 212 and meshed with the driving gear 61, a first transmitting gear 632 fixed coaxially on the driven gear 633, and a second transmitting gear 622 mounted coaxially to the hub portion 621 so as to mesh with the first transmitting gear 632 such that the second transmitting gear 622 rotates at a slower speed than the driving gear 61.

In the preferred embodiment, the central portion of the oil accumulating plate 40 defines a central mounting hole 41 therethrough. The hub portion 621 defines an upper mounting seat 623 press-fitted into the mounting hole 41 to expose the upper mounting seat 623 outwardly from the oil accumulating plate 40. A rubber ring 625 is sleeved around the hub portion 621 to prevent leakage of oil from the oil accumulating plate 40 into the tubular member 50.

The roasting rack member 70 includes an upright post 71 fixed to the upper mounting seat 623, an annular ring 722 disposed around the upright post 71 downstream to flow direction of heated air from the radiant heating element 211, and a plurality of iron rods 72 that extend radially and outwardly from the upright post 71 so as to straddle between the upright post 71 and the annular ring 722.

Figure 4:
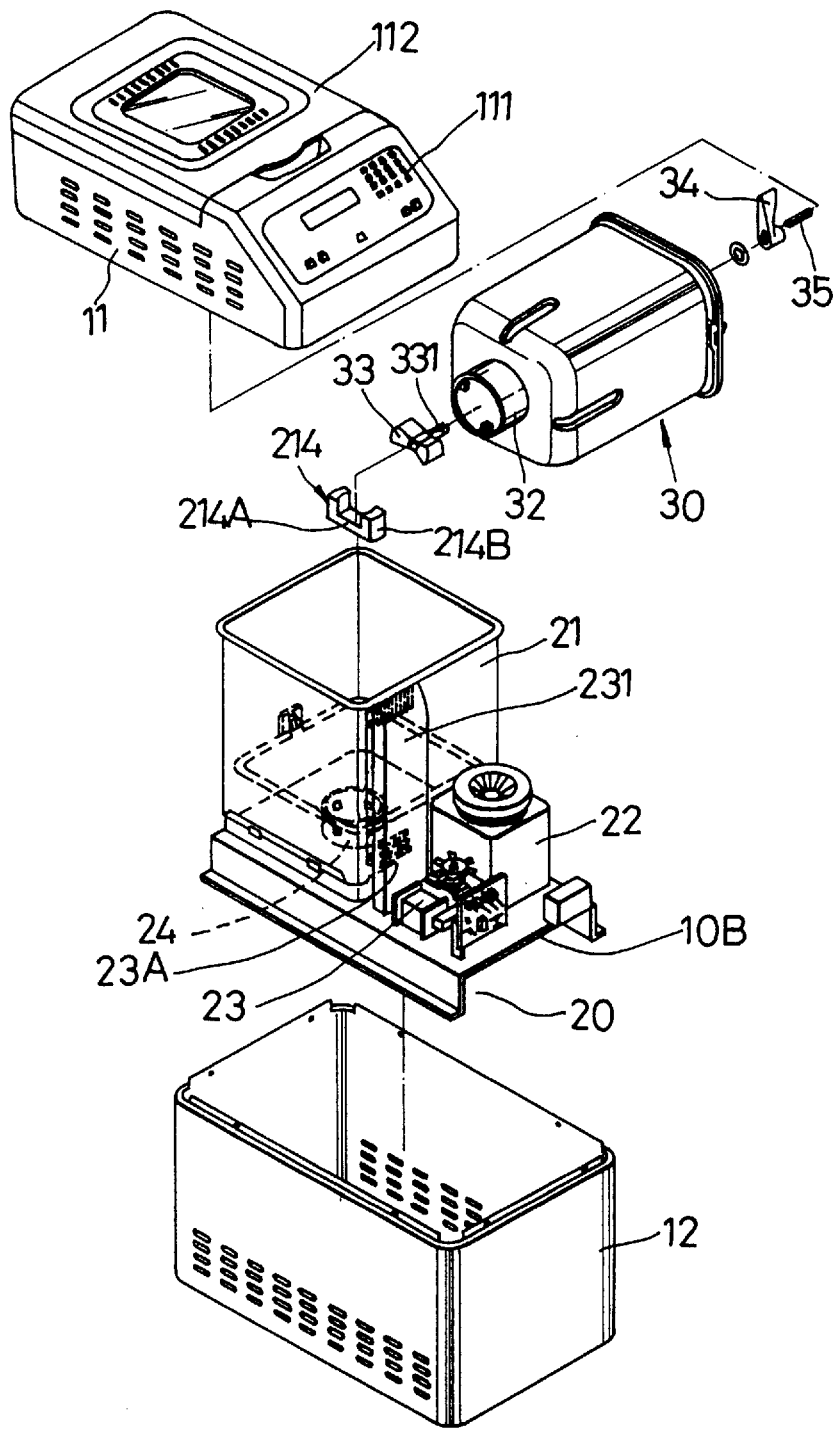
FIG. 4 illustrates how a bread baking case is installed into an inner annular wall of the preferred embodiment in order to convert the same into a bread making apparatus after removal of the oil accumulating plate and the roasting rack member shown in FIG. 3.
Figure 7:
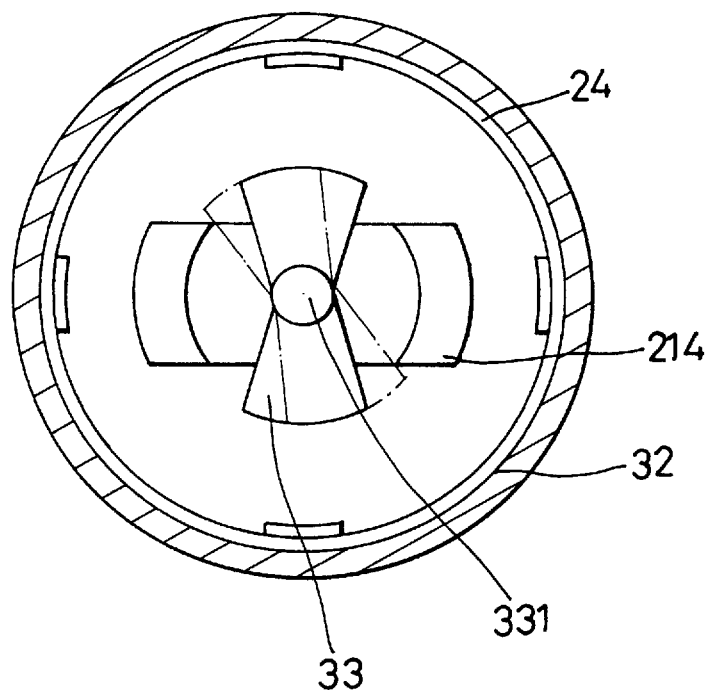
FIG. 7 is a bottom view of a bread baking case mounted in the inner annular wall of the preferred embodiment after removal of the roasting rack member and the oil accumulating plate from the inner annular wall.
Figure 8:
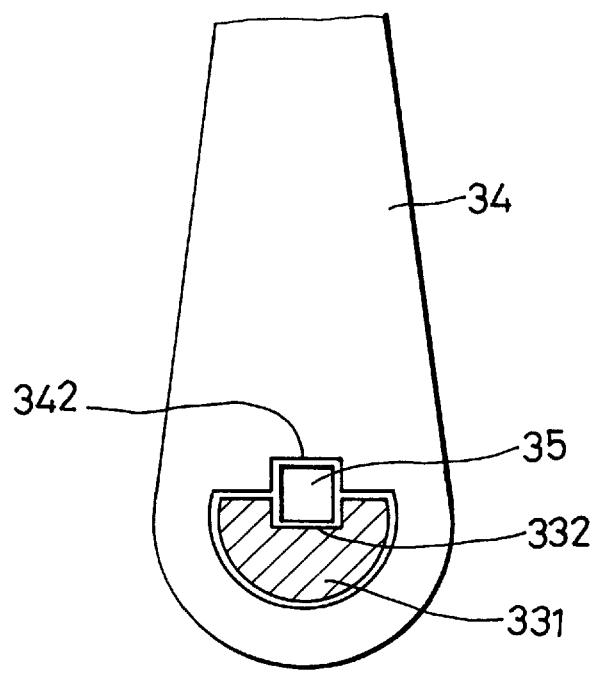
FIG. 8 shows how a kneading blade is mounted in the bread baking case of the preferred embodiment.

Referring FIGS. 4 and 7, the preferred embodiment is further provided with a bread making assembly which is adapted to be mounted in the inner annular wall 21 after removal of the tubular member 50, the oil accumulating plate 40, and the roasting rack member 70 (see FIG. 3). The bread baking assembly includes a baking case 30 within which raw ingredients to be kneaded are received so as to form dough, a lower barrel 32 that extends downwardly from a bottom of the baking case 30 so as to mount detachably on the inner bottom wall 10B after removal of the tubular member 50 and the oil accumulating plate 40 from the inner bottom wall 10B, and a third coupling member 33 disposed rotatably in the lower barrel 32 and engageable with the first coupling member 214. The third coupling member 33 is provided with a connecting shaft 331 which extends coaxially of the rotating shaft 212 and into the baking case 30. The connecting shaft 331 defines a semi-rectangular groove 332 (see FIG. 8) along the entire length thereof. A kneading blade 34 is disposed in the baking case 30, and has a semi-rectangular groove 342 (see FIG. 8) formed therethrough such that a rectangular key 35 can be inserted so as to be sandwiched in the grooves 332, 342. The kneading blade 34 thus rotates at a same speed as the rotating shaft 212 to knead the raw ingredients in the baking case 30.

Figure 9:
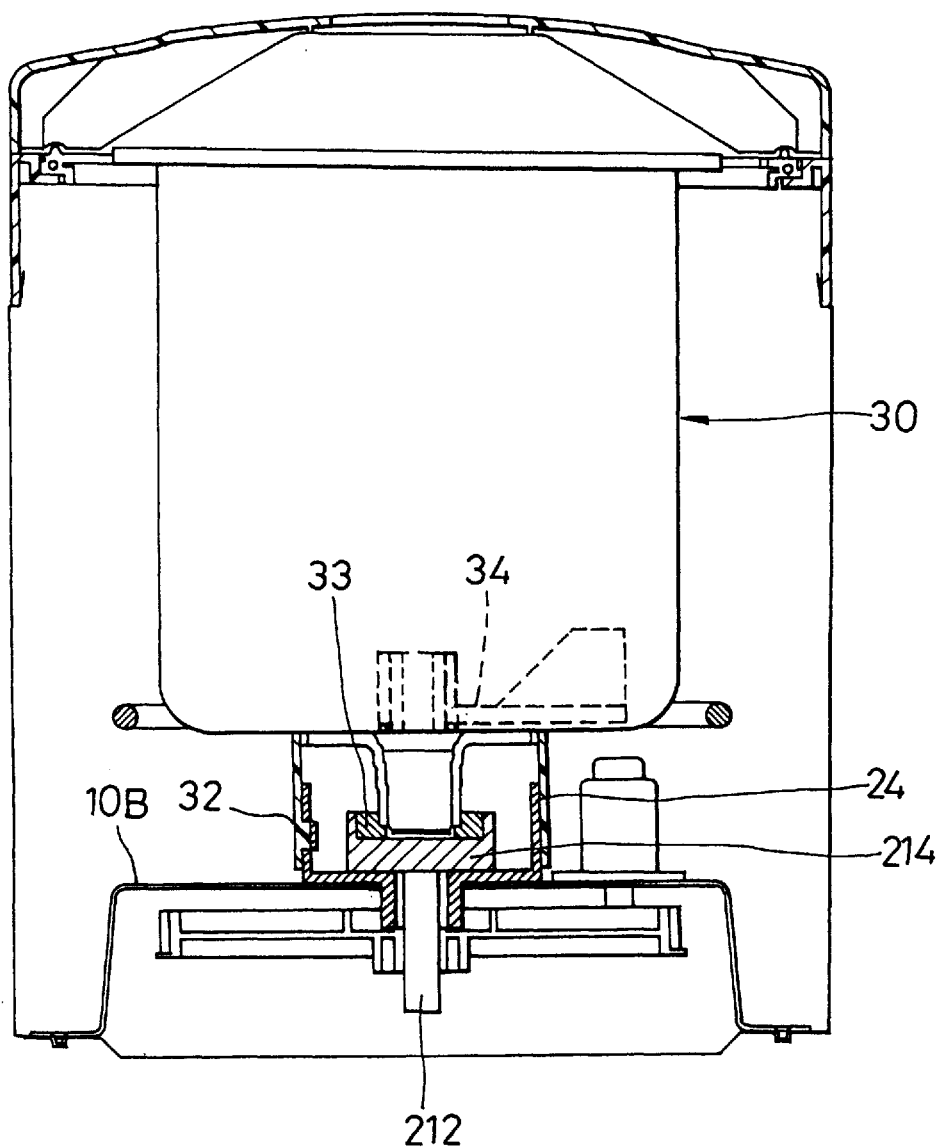
FIG. 9 is a sectional view of the preferred embodiment, wherein the latter has been converted into a bread making apparatus.

As illustrated in FIGS. 5 and 9, a hollow holding member 24 can be fixed on the inner bottom wall 10B to surround the first coupling member 214 therein such that the lower constricted portion 52 of the tubular member 50 and the lower barrel 32 of the baking case 30 can be mounted detachably on the holding member 24.

With this invention thus explained, it is apparent that numerous modifications and variations can be made without departing from the scope and spirit of this invention. It is therefore intended that this invention be limited only as indicated in the appended claims.

I claim:

1. A roasting apparatus easily convertible into a bread baking apparatus which makes dough by kneading raw ingredients introduced into a bread baking case installed in an oven, the roasting apparatus comprising:

an outer bottom wall;

an outer annular wall extending upwardly from a periphery confining said outer bottom wall to form an outer upper portion and an outer lower portion;

an inner bottom wall disposed inwardly and upwardly spaced apart from said outer bottom wall to define a lower accommodation chamber between said outer and inner bottom walls;

an inner annular wall extending upwardly from a periphery confining said inner bottom wall to form an inner upper portion and an inner lower portion which are disposed inwardly and laterally spaced apart from said outer annular wall to define a roasting chamber in said inner annular wall;

a radiant heating element disposed on an inner surface of said inner lower portion;

a ventilation duct interposed between said inner and outer lower portions, and having an air inlet disposed at a level below said radiant heating element, and in air stream communication with said roasting chamber at a position lower than said radiant heating element;

an air ventilation member disposed to suck air into said ventilation duct via said air inlet so as to distribute heat from said radiant heating element to said roasting chamber via convection;

a drive member disposed in said lower accommodation chamber, including a drive shaft mounted rotatably on and extending upwardly and outwardly of said inner bottom wall to define a first rotation axis extending from said inner lower portion toward said inner upper portion in an upward direction;

a first coupling member including a first central portion mounted fixedly on said drive shaft, a first peripheral portion around said first central portion, and a first coupling unit disposed on said first peripheral portion;

a second coupling member including a second central portion, a rotating axle disposed on said second central portion and coaxial to and spaced apart from said drive shaft, a second peripheral portion disposed around said second central portion, and a second coupling unit disposed on said second peripheral portion such that through an engagement of said first and second coupling units, said rotating axle is driven to rotate at a same speed as said drive shaft;

an oil accumulating plate having a central portion, a peripheral portion around said central portion, and a hub portion disposed underneath a bottom surface of said central portion to define a second rotation axis coaxial to said first rotation axis, said hub portion being coaxially spaced and rotatable relative to said rotating axle;

a speed reduction mechanism coupling said rotating axle and said hub portion such that speed of said hub portion is slower than that of said rotating axle; and a roasting rack member disposed on and spaced apart from said oil accumulating plate and adapted to hold or suspend food that is to be roasted.

2. The roasting apparatus as defined in claim 1, further comprising a tubular member permitting extension of said rotating axle therethrough, and having a lower constricted portion mounted detachably on said inner bottom wall, and an upper enlarged portion defining an upper accommodating chamber to receive said hub portion therein and to support said oil accumulating plate thereabove.

3. The roasting apparatus as defined in claim 2, wherein said speed reduction mechanism includes a driving gear disposed in said upper accommodating chamber and fixed coaxially on said rotating axle, a driven gear disposed offset relative to said rotating shaft and meshed with said driving gear, a first transmitting gear fixed coaxially on said driven gear, and a second transmitting gear coaxially mounted to said hub portion and meshed with said first transmitting gear such that said second transmitting gear rotates at a slower speed than said driving gear.

4. The roasting apparatus as defined in claim 3, wherein said central portion of said oil accumulating plate defines a central mounting hole therethrough, said hub portion defining an upper mounting seat press-fitted into said mounting hole to expose said upper mounting seat outwardly from said oil accumulating plate.

5. The roasting apparatus as defined in claim 4, wherein roasting rack member includes an upright post fixed to said mounting seat, an annular ring disposed around said upright post downstream to flow direction of heated air from said radiant heating element, and a plurality of iron bars extending radially and outwardly from said upright post.

* * * * *